(12) United States Patent
Carlson et al.

(10) Patent No.: US 11,732,836 B2
(45) Date of Patent: *Aug. 22, 2023

(54) PAN TILT UNIT

(71) Applicant: Anduril Industries, Inc., Irvine, CA (US)

(72) Inventors: McHenry Carlson, Tustin, CA (US); Torin Herndon, Laguna Hills, CA (US); John Henry Harris, III, Anaheim, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,460

(22) Filed: Jan. 24, 2022

(65) Prior Publication Data

US 2022/0214009 A1 Jul. 7, 2022

Related U.S. Application Data

(63) Continuation of application No. 16/576,326, filed on Sep. 19, 2019, now Pat. No. 11,268,651.

(51) Int. Cl.
| | |
|---|---|
| *F16M 11/12* | (2006.01) |
| *F16M 11/18* | (2006.01) |
| *G03B 17/56* | (2021.01) |
| *G08B 13/196* | (2006.01) |
| *H01R 39/12* | (2006.01) |

(52) U.S. Cl.
CPC ........... *F16M 11/126* (2013.01); *F16M 11/18* (2013.01); *G03B 17/561* (2013.01); *G08B 13/1963* (2013.01); *H01R 39/12* (2013.01)

(58) Field of Classification Search
CPC .... G03B 17/561; F16M 11/126; F16M 11/18; H01R 39/12; G08B 13/1963
USPC ........................................................ 348/373
See application file for complete search history.

(56) References Cited

U.S. PATENT DOCUMENTS

| | | | | |
|---|---|---|---|---|
| 4,655,567 A | * | 4/1987 | Morley .................. | F16M 11/18 396/419 |
| 4,673,268 A | * | 6/1987 | Wheeler ............ | G08B 13/1963 396/419 |
| 4,937,675 A | * | 6/1990 | Starceski ............... | F16M 11/10 396/529 |
| 5,063,377 A | * | 11/1991 | Smith .................. | G09F 15/0081 345/110 |
| 5,111,288 A | * | 5/1992 | Blackshear ...... | G08B 13/19632 348/373 |
| 5,627,616 A | * | 5/1997 | Sergeant ................ | H04N 7/183 348/E5.025 |
| 5,850,579 A | * | 12/1998 | Melby ................ | F16M 11/2014 396/428 |
| 6,045,272 A | * | 4/2000 | Ryan ...................... | G03B 17/00 396/428 |

(Continued)

*Primary Examiner* — Jonathan Liu
*Assistant Examiner* — Guang H Guan
(74) *Attorney, Agent, or Firm* — Van Pelt, Yi & James LLP

(57) ABSTRACT

A pan tilt unit comprises a support, a slip ring, a rotating platform, and a tilting mechanism. An outer rotating portion of the slip ring is able to rotate about the support. The slip ring comprises connections between an inner static portion of the slip ring and the outer rotating portion of the slip ring. The rotating platform is coupled to the outer rotating portion of the slip ring. The tilting mechanism is coupled to the rotating platform.

19 Claims, 13 Drawing Sheets

(56) References Cited

U.S. PATENT DOCUMENTS

| | | | |
|---|---|---|---|
| 6,124,892 A * | 9/2000 | Nakano | G08B 13/19632 348/373 |
| 6,628,338 B1 * | 9/2003 | Elberbaum | G08B 13/19636 348/373 |
| 6,639,623 B2 * | 10/2003 | Howell | F16M 11/10 362/11 |
| 6,830,337 B2 * | 12/2004 | Angerpointner | F16M 11/10 348/373 |
| 7,503,708 B2 * | 3/2009 | Yang | F16M 11/38 224/908 |
| 7,852,211 B2 * | 12/2010 | Gunn | H02J 13/00017 340/541 |
| 8,305,439 B2 * | 11/2012 | Cheng | H04N 7/22 398/115 |
| 9,083,868 B2 * | 7/2015 | Galindo Verdasco | F16M 11/10 |
| 9,369,613 B2 * | 6/2016 | Maekawa | B60R 11/04 |
| 9,410,659 B2 * | 8/2016 | Troy | G01N 29/265 |
| 9,686,452 B2 * | 6/2017 | Jones | G09B 5/14 |
| 9,826,128 B1 * | 11/2017 | Ballard | G08B 13/19632 |
| 10,955,620 B2 * | 3/2021 | Boccoleri | G02B 6/3604 |
| 11,268,651 B2 * | 3/2022 | Carlson | F16M 11/18 |
| 2001/0030683 A1 * | 10/2001 | Howell | F16M 13/027 348/61 |
| 2001/0045991 A1 * | 11/2001 | Van Rens | F16M 11/18 348/211.99 |
| 2003/0194230 A1 * | 10/2003 | Tamura | G08B 13/1963 396/427 |
| 2004/0012674 A1 * | 1/2004 | Wada | G08B 13/1963 348/169 |
| 2008/0068493 A1 * | 3/2008 | Hida | H04N 5/2254 348/E5.025 |
| 2008/0278578 A1 * | 11/2008 | Kahn | F16M 11/10 348/169 |
| 2011/0268433 A1 * | 11/2011 | Yim | H04N 7/185 396/428 |
| 2012/0206604 A1 * | 8/2012 | Jones | H04N 5/247 348/143 |
| 2018/0367738 A1 * | 12/2018 | Fukuzawa | H04N 5/23296 |
| 2021/0088175 A1 * | 3/2021 | Carlson | G08B 13/1963 |
| 2022/0214009 A1 * | 7/2022 | Carlson | H01R 39/12 |

\* cited by examiner

PAN TILT UNIT

CROSS REFERENCE TO OTHER APPLICATIONS

This application is a continuation of U.S. patent application Ser. No. 16/576,326 entitled PAN TILT UNIT filed Sep. 19, 2019 which is incorporated herein by reference for all purposes.

BACKGROUND OF THE INVENTION

Pan and tilt systems are often used for remote directional control of cameras and other position-sensitive sensors (e.g., radar or lidar). Typical pan and tilt systems suffer from limited pan rotation capability, often restricted by the cabling required to transmit data and power to the various attached payloads. To overcome rotation issues associated with cabling, some systems are designed to limit rotation to less than 360 degrees which results in a 'dead zone' region of sensor coverage. Other pan tilt systems can rotate more than 360 degrees (e.g., using a flex cable) but need to unwind at some point resulting in an undesirable communication delay or an undesirable delay from having to reset to an initial position.

BRIEF DESCRIPTION OF THE DRAWINGS

Various embodiments of the invention are disclosed in the following detailed description and the accompanying drawings.

DETAILED DESCRIPTION

Figure 1:
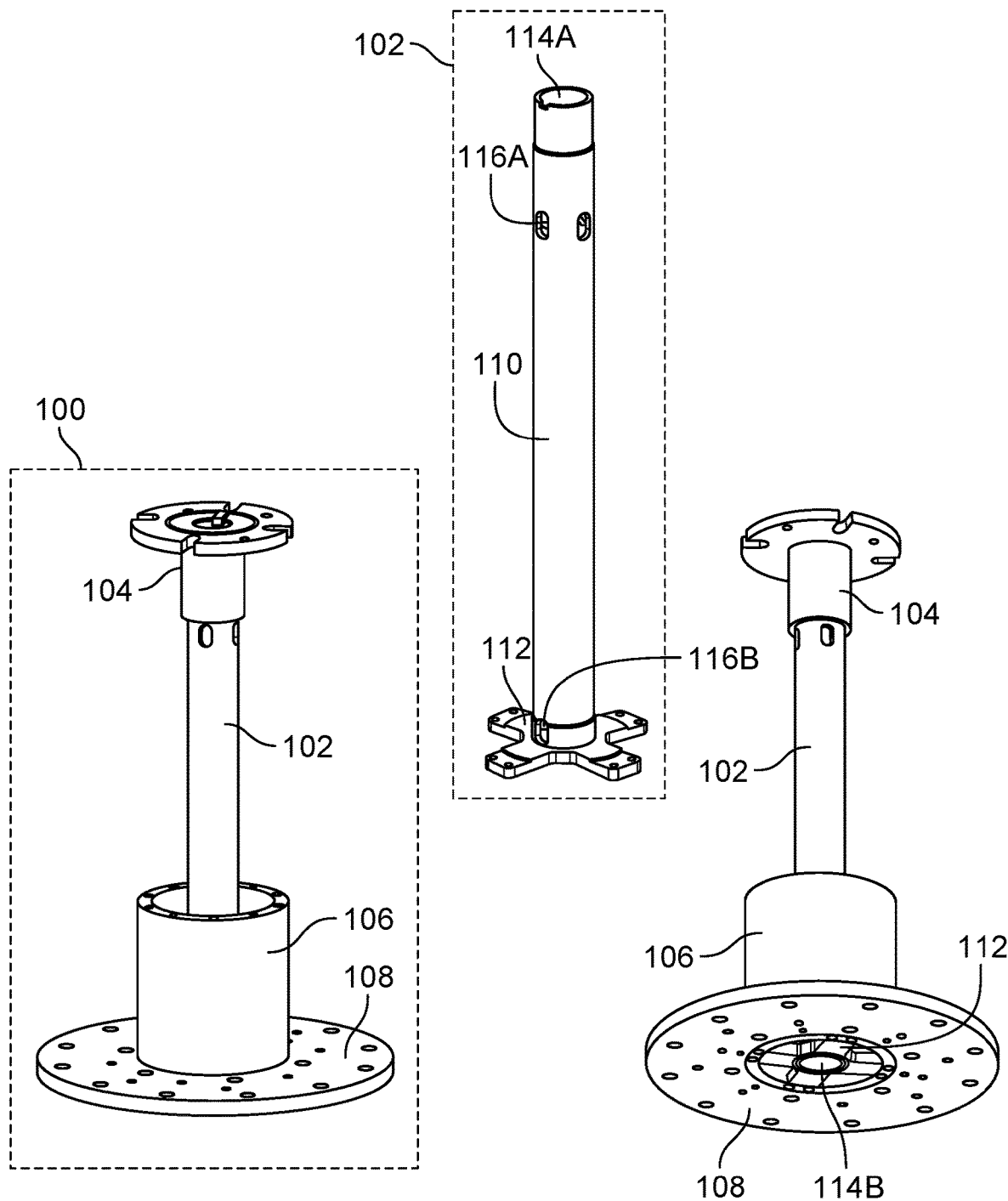
FIG. 1 is a block diagram illustrating perspective views of an embodiment of a pan tilt unit base assembly and support.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A pan tilt unit with no pan rotation limit is disclosed. The unit comprises a support, a slip ring, a rotating platform, and a tilting mechanism. The outer rotating portion of the slip ring is able to rotate about the support. The slip ring comprises connections between an inner static portion of the slip ring and the outer rotating portion of the slip ring. The rotating platform is coupled to the outer rotating portion of the slip ring. The tilting mechanism is coupled to the rotating platform. In various embodiments, coupled comprises one or more of the following: mechanically coupled (e.g., using screw(s), bolt(s), clip(s), clamp(s), etc.), adhesively coupled (e.g., using glue, epoxy, etc.), permanently affixed (e.g., using welding, brazing, soldering, etc.), or any other appropriate coupling.

One or more pan tilt units are a component(s) of a sensor tower or station (e.g., a fixed and/or mobile station) used to monitor and protect a surrounding area. In various embodiments, the sensor or tower station is used to monitor a border area, monitor against threat drones (e.g., for detection and interception of an incoming threat drone), or any other appropriate monitoring. In some embodiments, sensor payloads that require directional positioning (e.g., a camera, an audio sensor, a radar sensor, or a lidar sensor) are mounted on the one or more pan tilt units. Rapid and precise positioning of the sensor payload(s) without limitation is required to provide target acquisition and tracking so that the sensor tower can acquire sufficient and appropriate data for monitoring. This is especially important in the case of a counter drone system to allow rapid determination whether a detected object is a threat drone, and if determined to be a threat drone, provide precise and real-time tracking/intercept information. The top of the pan tilt unit is stationary to allow stacking or the placement of a unit with fixed orientation (e.g., a radio frequency antenna or optical communication link that needs a specific orientation for optimal functioning).

The disclosed pan tilt unit is an improvement over typical pan tilt units in that it is able to rapidly and precisely pan and tilt attached payloads (e.g., sensor payloads) without limitation in the number of panning rotations. The rotations of a pan tilt unit are typically restricted by the cabling required to transmit data and power to various attached payloads. For example, some pan tilt units are mechanically restricted to less than a 360-degree rotation (e.g., a 330-degree limit) which results in a 'dead zone' region of sensor coverage. Other pan tilt units can rotate more than 360 degrees (e.g., using a continuous flex cable) but need to unwind at some point resulting in an undesirable communication delay or undesirable motion to reset to an initial position. The disclosed pan tilt unit overcomes these limitations by use of slip rings that provide a wired mechanical connection without rotation limit.

A slip ring is an electromechanical device that allows the transmission of power and electrical signals from a stationary to a rotating structure (e.g., a static inner portion of the slip ring to a rotating outer portion of the slip ring). A slip ring typically comprises a stationary graphite or metal contact (i.e., a brush) which rubs on the outside diameter of a rotating metal ring. As the metal ring turns, the electric current or signal is conducted through the stationary brush to the metal ring making the connection. In some embodiments, the brushes, as well as the unit's payload platform mounts, rotate around the central cylindrical support. In some embodiments, the slip ring is designed to be electrically 'transparent' to the transmission properties of the wiring or cable runs that pass through it (e.g., having identical or near-identical resistance, impedance, and capacitance values whether the slip ring is stationary or rotating). As used herein, a cable comprises an assembly of one or more wires running side by side or bundled and used to carry electric current. In some embodiments, the cable includes shielding to prevent crosstalk between wires of the cable and to shield the wires in the cable from electrical signals external to the cable.

In various embodiments, the support comprises a cylindrical support, a rigid hollow tube (e.g., an aluminum tube), a support with a non-cylindrical cross section (e.g., a square cross section, a rectangular cross section, an elliptical cross section, etc.), or any other appropriate support. Data and power to the various payloads are transmitted via cables that run from the bottom of the pan tilt unit (e.g., via a wiring harness through the cylindrical support and one or more slip rings) to the payloads at the sides and/or top.

In some embodiments, the pan tilt unit comprises two mounts on opposite sides of the cylindrical support (e.g., to mount sensor payloads useful to monitoring and protecting a surrounding area). In some embodiments, the two mounts are coupled to move together around a common tilt axis. In some embodiments, the pan tilt unit comprises more than two mounts. In some embodiments, the two or more mounts are independently controllable for tilt position. In various embodiments, a mount of the two or more mounts is coupled to one or more of the following payloads: a camera, an audio sensor, a radar sensor, a lidar sensor, a laser illuminator, or any other appropriate payload. In some embodiments, any tilt mount includes a slip ring so that tilt motion is not limited.

In some embodiments, pulley and belt assemblies are used to position the pan and tilt payload mounts. In some embodiments, the gear and belt assemblies are driven by electric motors (e.g., servo motors) via motor controllers (e.g., servo controllers). In various embodiments, other drive mechanisms are used to position the pan and/or tilt payload mounts including geared drives, worm drives, belt and pulley systems, or any other appropriate drive mechanisms. Power and control signals to the motor and motor controllers are transmitted via cables that run from the bottom or top of the pan tilt unit (e.g., via a wiring harness through the cylindrical support and one or more slip rings) to the pan and tilt motors coupled to rotating support platforms positioned around the pan tilt unit cylindrical support.

In some embodiments, the pan tilt unit comprises a stationary mount (e.g., a top platform is coupled to a top of the cylindrical support). A stationary platform is important for payloads that have orientation sensitivity—for example, payloads used in long-distance communication (e.g., directional antennas used in satellite communication). Traditional pan tilt units used for sensor systems also have an added challenge of calculating object positions due to various translations of attached sensor payloads (e.g., a camera). The disclosed pan tilt unit allows easier calculations to derive an object coordinate due to a known stationary coordinate; that is, calculating target position would be more difficult if the tilt axis didn't pass through the center of the rotation axis. In some embodiments, a computation unit is coupled to the top of the cylindrical support.

In various embodiments, the pan tilt unit receives positioning instructions from a network (e.g., a wired and/or wireless computer network), a local computer (e.g., mounted on top of the unit), and/or user interface that provides the unit with positioning instructions—for example, positioning instructions from a remote server or user, or during automatic mode (e.g., tracking, auto scanning, etc.).

In some embodiments, the pan tilt unit comprises an enclosure that seals the unit against weather and debris ingress (e.g., rain, snow, wind, dust, sand, etc.). In some embodiments, the pan tilt unit constituent components are chosen to withstand operation at extreme temperatures and relative humidity (RH) levels.

In various embodiments, the slip ring comprises a power slip ring, a data slip ring, a combined power and data slip ring, or any other appropriate slip ring. In some embodiments, a computer is mounted on the rotating platform of the PTU and then a data slip ring is not needed but a power slip ring is still necessary to allow infinite rotation. The static structural tube or support enables providing electrical connection (e.g., data and/or power) between the bottom and the top of the pan tilt unit—for example, between two pan tilt units, between a pan tilt unit and a static payload, between two static payloads (e.g., a mounting platform, a directional antenna, etc.).

In various embodiments, the support comprises a path or channel for passing wiring, tubing, and/or hoses, or any method of transmitting data, power, or fluid transfer through the PTU independently of the rotation and/or tilt axis, such that a system located at the bottom of the PTU is in direct communication with a system or systems located at the top of the PTU or systems located on a rotating platform of the PTU.

FIG. 1 is a block diagram illustrating perspective views of an embodiment of a pan tilt unit (PTU) base assembly and support. In the example shown in FIG. 1, the perspective view on the left illustrates PTU base assembly 100 comprising cylindrical support 102, stationary mount 104, PTU base collar 106, and PTU base flange 108. The perspective view in the middle illustrates cylindrical support 102 comprising support tube 110, cylindrical support base 112, interior through-hole 114A, and side through-hole 116A, and side through-hole 116B. The perspective view on the right shows an upward-looking view of PTU base assembly 100 that illustrates interior through-hole 114B that runs the length of cylindrical support 102 exiting at the top of cylindrical support 102 (as illustrated in the perspective view in the middle as interior through-hole 114A). The perspective view on the right also illustrates that cylindrical support 102 is coupled to PTU base collar 106 via cylindrical support base 112. PTU base collar 106 is coupled to PTU base flange 108 (e.g., via a threaded coupling). In some embodiments, PTU base collar 106 and PTU base flange 108 are machined from one piece of metal (e.g., aluminum). PTU base collar 106 is designed to house one or more slip rings and to couple to a pan belt gear (not shown) used for PTU rotation. PTU base flange 108 is used to couple the entire PTU to a sensor tower, station, or to another PTU (e.g., using through-holes in the flange).

In some embodiments, PTU base assembly 100 is made of aluminum or any other appropriate material to provide strength, rigidity, durability, and light weight (e.g., titanium). In various embodiments, cylindrical support 102 comprises a rigid hollow tube with an outer diameter of two inches, three inches, four inches, or any other appropriate outer diameter. The diameter and wall thickness of cylindrical support 102 is determined in part to provide sufficient mechanical strength to support the desired payloads and sufficient interior space to house the cables to the one or more payloads. Sufficient strength and interior space of the cylindrical support is a significant design factor when considering using the PTU in a multiple stacked configuration. In the example shown, cylindrical support 102 comprises multiple side through-holes (e.g., side through-hole 116A and side through-hole 116B) to allow cabling to pass from the interior to the exterior of cylindrical support 102. In some embodiments, stationary mount 104 is used to couple a computation unit to the top of cylindrical support 102. In some embodiments, interior through-hole 114A and interior through-hole 114B is used to allow cabling to enter the PTU to supply power and/or data to the computation unit, or any other appropriate device, mounted on stationary mount 104.

In various embodiments, cylindrical support 102 does not have a round cross section—the support instead has a square, triangular, oval, or any other appropriate shaped cross section. For a non-round cross section, an adapter that mates the outer shape of the support with the inner shape of a slip ring is used to mount the slip ring to the support.

Figure 2:
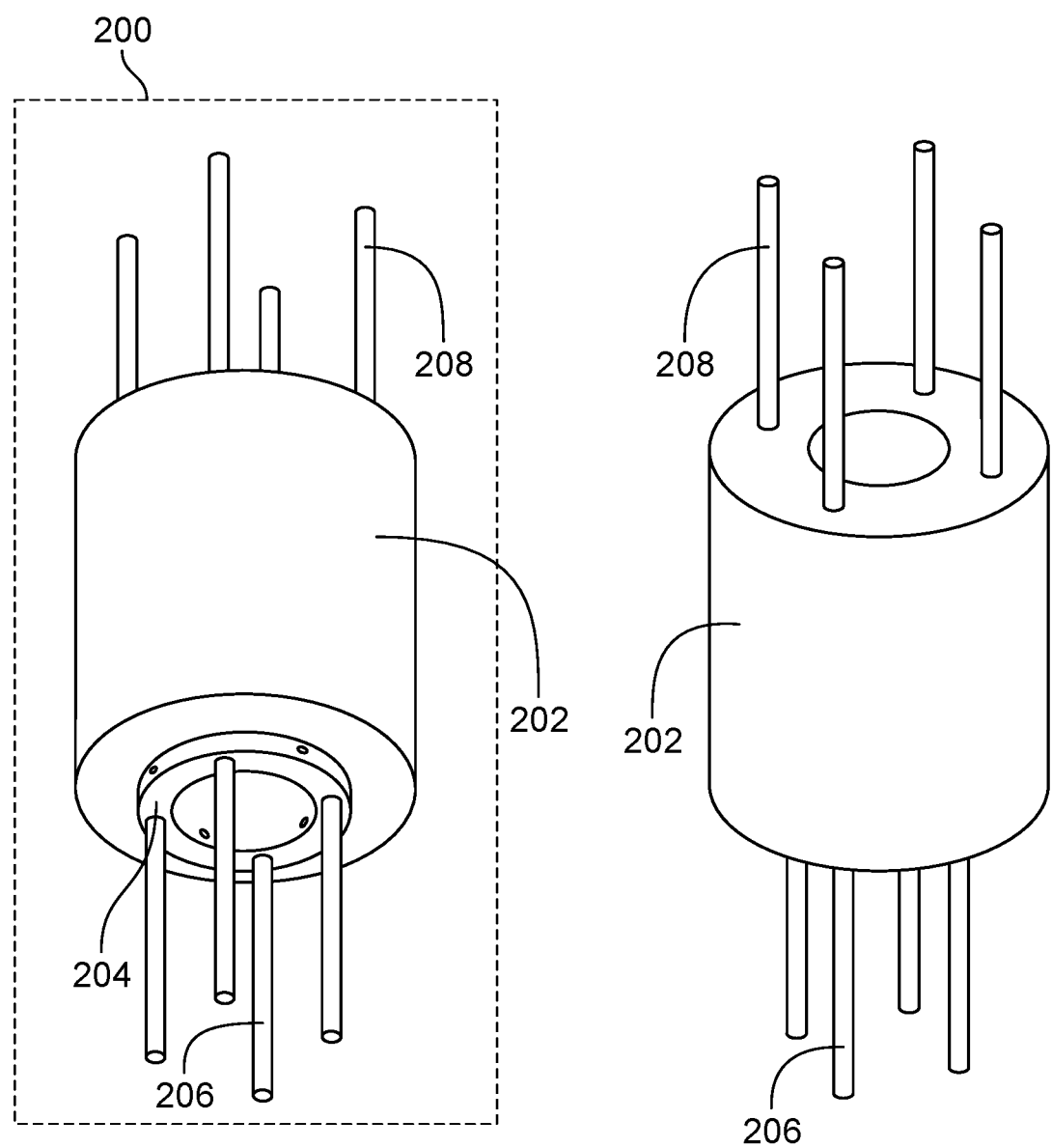
FIG. 2 is a block diagram illustrating perspective views of an embodiment of a data slip ring unit.

FIG. 2 is a block diagram illustrating perspective views of an embodiment of a data slip ring unit. In the example shown, the perspective view on the left illustrates data slip ring unit 200 comprising slip ring housing 202, slip ring fixation collar 204, input data cables 206, and output data cables 208. Slip ring fixation collar 204 is used to couple the data slip ring unit to the PTU cylindrical support (e.g., via set screws or any appropriate method of coupling) to prevent the inner portion of the slip ring unit from rotating. Slip ring housing 202 is free to rotate around slip ring fixation collar 204 such that input data cables 206 remain stationary while output data cables 208 rotate with slip ring housing 202. In some embodiments, slip ring housing 202 and slip ring fixation collar 204 are made of aluminum (e.g. passivated aluminum) or any other appropriate material.

In various embodiments, slip ring housing 202 houses one or more individual connection paths each with a contactor (e.g., a contacting brush or copper rod) touching a rotating metal inner ring, sometimes referred to as waveguides, to make the connection path. Each of the individual connection paths, allows transmission of data and/or power to and/or from the various PTU payloads—for example, 1, 2, 3, 10, 20, 30, or any other appropriate number of connection paths as required to meet the PTU payload design criteria for data transmission. In some embodiments, the data connections comprise a plurality of shielded connections (e.g., Ethernet cables). In some embodiments, the data connections are used to transmit control signals to the PTU and its various payloads (e.g., toggle power on/off, control pan or tilt motor rotation, etc.). In some embodiments, the plurality of shielded connections comprise alternating signal and ground connections for the slip ring unit. In some embodiments, the data connections comprise 4, 8, 12, 16, or 24 data connections.

In some embodiments, separate slip ring units are used to supply power. In some embodiments, a power slip ring comprises one or more connection paths. In some embodiments, the power slip ring includes any number N of power connectors and a ground connector. In some embodiments, the power slip ring's outer housing is coupled to the rotating PTU platform, while the inner ring is fixed to the cylindrical support. In this configuration, one end of the slip ring is free to rotate with the payload mount, and one end is completely static and coupled to the support (e.g., the cylindrical support).

In some embodiments, power and data transmission is combined into a single slip ring unit. In various embodiments, any number N of data and/or power slip ring units, each comprising any number of connections, can be stacked one upon the other around the PTU cylindrical support to provide as many connections as desired. In various embodiments, the data slip ring unit is designed and tested for minimal signal crosstalk between the interior slip rings, and from one data slip ring unit to another (e.g., for multiple stacked slip ring units around one PTU cylindrical support).

Figure 3A:
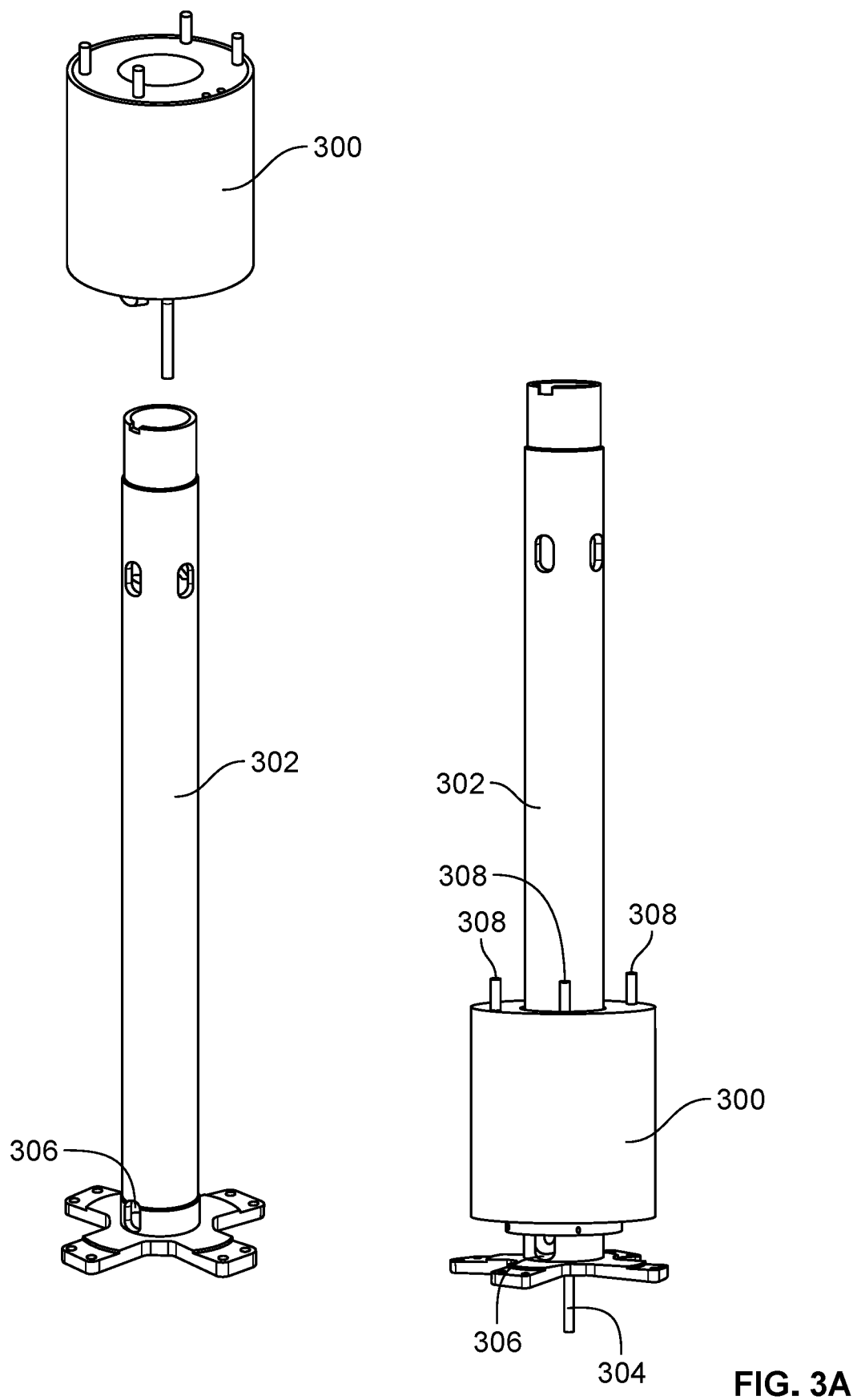
FIG. 3A is a block diagram illustrating an embodiment of a power slip ring unit positioned above and around a pan tilt unit cylindrical support.

FIG. 3A is a block diagram illustrating an embodiment of a power slip ring unit positioned above and around a pan tilt unit cylindrical support. In some embodiments, PTU cylindrical support 302 is identical to cylindrical support 102 of FIG. 1. In the example shown in FIG. 3A, the perspective view on the left illustrates power slip ring unit 300 in position to be lowered from above into position around PTU cylindrical support 302 (e.g., as shown in side view on the right). Once power slip ring unit 300 is at the desired vertical position, it is coupled to PTU cylindrical support 302 via a slip ring fixation collar (e.g., a fixation collar such as slip ring fixation collar 204 of FIG. 2). In some embodiments, power slip ring unit 300 is coupled to PTU cylindrical support 302 using a thread, using glue, or any other appropriate fixation method. Power/ground input cable 304 is routed through hole 306 to pass down through the center of PTU cylindrical support 302. In some embodiments, the lower positioned slip ring (e.g., power slip ring unit 300) is used to provide power to payloads mounted to a PTU via power/ground output cables 308.

Figure 3B:
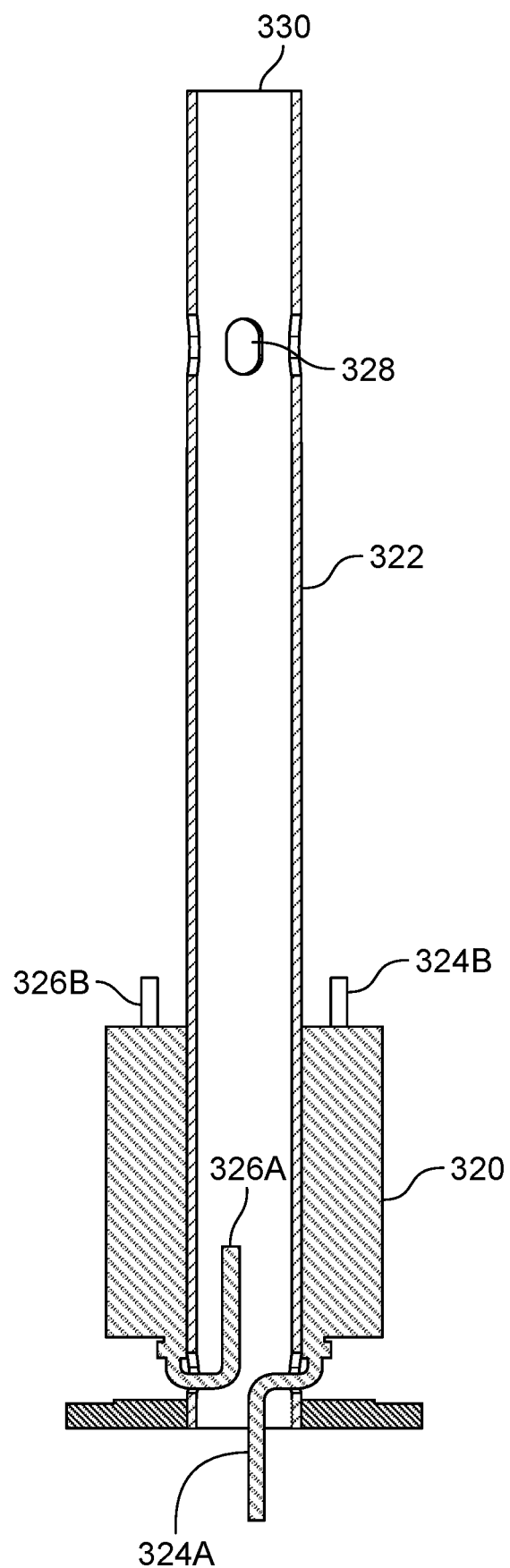
FIG. 3B is a block diagram illustrating a cross-sectional view of an embodiment of a power slip ring unit positioned around a pan tilt unit cylindrical support.

FIG. 3B is a block diagram illustrating a cross-sectional view of an embodiment of a power slip ring unit positioned around a pan tilt unit cylindrical support. In some embodiments, power slip ring unit 320 of FIG. 3B comprises power slip ring unit 300 of FIG. 3A. In some embodiments, cylindrical support 322 comprises cylindrical support 102 of FIG. 1. In some embodiments, power/ground input cable 324A is routed up or down through the interior of cylindrical support 322 and exits a hole in the lower portion of cylindrical support 322 (e.g., via hole 306 of FIG. 3A). In some embodiments, power/ground cable 324A connects to power slip ring unit 320 to provide power to various mounted payloads via power/ground cable 324B.

In some embodiments, power/ground cable 326A is threaded upward through the interior of cylindrical support 322. In various embodiments, power/ground cable 326A exits cylindrical support 322 via side through-hole 328 or via opening 330 at the top of cylindrical support 322. In various embodiments, power/ground cable 324A is electrically continuous with power/ground cable 324B and power/ground cable 326A is electrically continuous with power/ground cable 326B.

In various embodiments, power slip ring unit 320 comprises a data slip ring (e.g., data slip ring unit 200 of FIG. 2) or a combined single data/power slip ring. In some embodiments, power/ground cable 324A, power/ground cable 324B, power/ground cable 326A, and power/ground cable 326B comprise data cables (e.g., Ethernet cables) to allow the transmission of data in either direction. In some embodiments, power/ground cable 324A, power/ground cable 324B, power/ground cable 326A, and power/ground cable 326B comprise wiring for both power and data transmission in either direction.

Figure 3C:
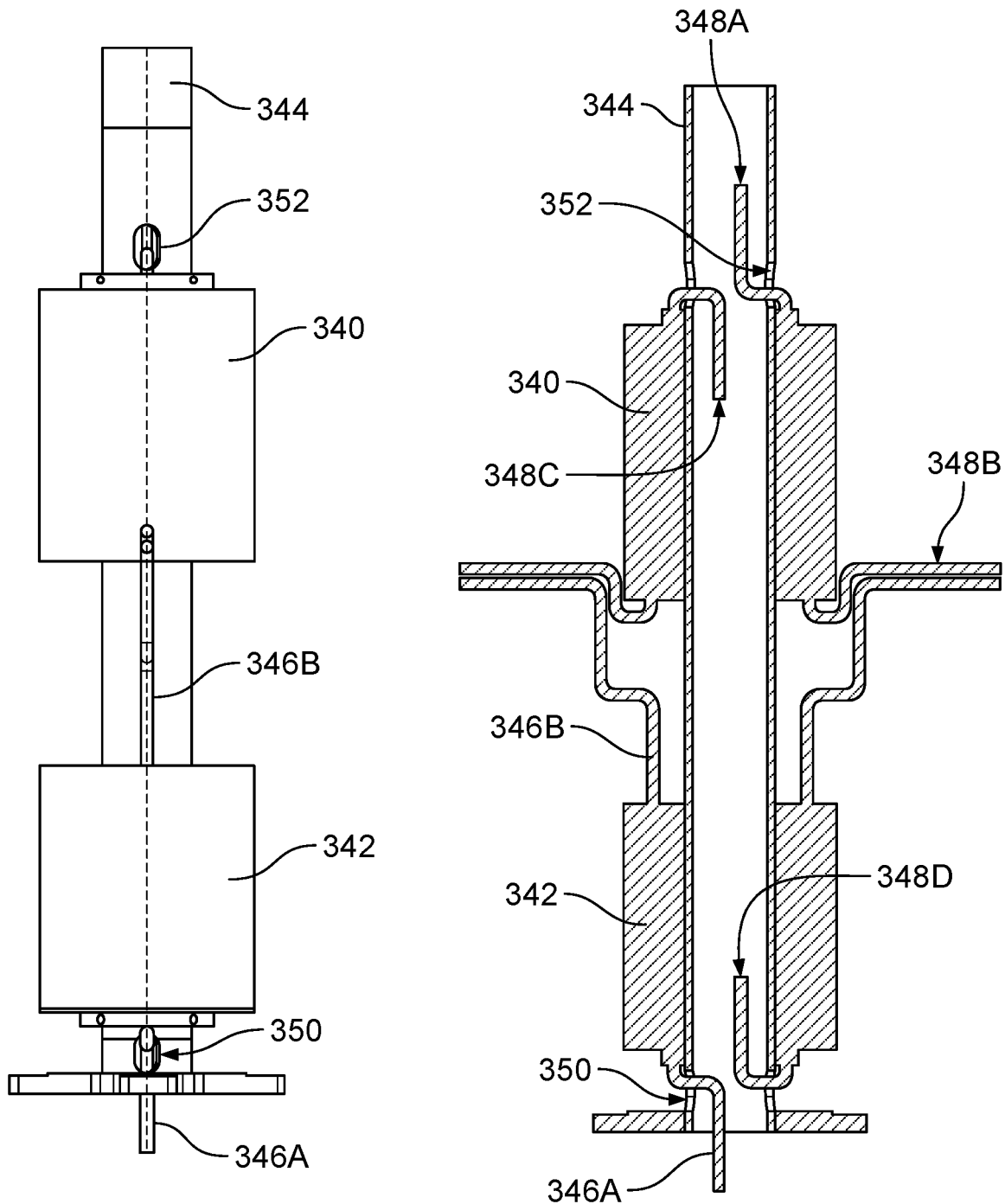
FIG. 3C is a block diagram illustrating side and cross-sectional views of an embodiment of lower (power) and upper (data) slip ring units positioned around a pan tilt unit cylindrical support.

FIG. 3C is a block diagram illustrating side and cross-sectional views of an embodiment of lower (power) and upper (data) slip ring units positioned around a pan tilt unit cylindrical support. In some embodiments, lower slip ring unit 342 of FIG. 3C comprises power slip ring unit 300 of FIG. 3A. In some embodiments, upper slip ring unit 340 of FIG. 3C comprises data slip ring unit 200 of FIG. 2. In some embodiments, cylindrical support 344 comprises cylindrical support 102 of FIG. 1.

In the example shown in FIG. 3C, the side view on the left illustrates upper slip ring unit 340 and lower slip ring unit 342 fixed in position around cylindrical support 344. In some embodiments, as illustrated in both left and right views of FIG. 3C, upper slip ring unit 340 is mounted upside down compared to lower slip ring unit 342. In some embodiments, as illustrated in the cross-sectional view on the right, cable 346A passes through the interior of cylindrical support 344 and exits side-through hole 350 to connect with lower slip ring unit 342. In some embodiments, cable 346B of lower slip ring unit 342 is used connect to one or more PTU payloads (e.g., to transmit power and/or data) and is free to rotate without rotation limit. In some embodiments, cable 346A is electrically continuous with cable 346B.

In some embodiments, as illustrated in the cross-sectional view on the right, cable 348A of upper slip ring unit 340 is available to connect to a top-mounted stationary PTU payload (e.g., a computation unit, a radar, etc.). In some embodiments, cable 348A of upper slip ring unit 340 passes through cylindrical support 344 to connect to a PTU payload not mounted on cylindrical support 344—for example, a PTU payload that is coupled to one of any number of stacked PTU's on top of cylindrical support 344.

In some embodiments, cable 348A passes through side hole 352 to the exterior of cylindrical support 344 and, via upper slip ring unit 340 and cable 348B, is used to transmit data and/or power to a side-mounted PTU payload (e.g., a camera or any other appropriate sensor) that is free to rotate without limit. In some embodiments, cable 348A is electrically continuous with cable 348B.

In various embodiments, one or more of the cables interior to cylindrical support 344 (i.e., cable 348A, cable 348B, cable 348C, and cable 348D) connect to a common bus (e.g., a data bus, a ground bus, and/or a power bus). In some embodiments, the bus is contained within cylindrical support 344. In various embodiments, the bus passes through cylindrical support 344 to one or more stacked PTU's or other static payloads on top of cylindrical support 344.

In various embodiments, power sources (e.g., batteries, solar panels, grid power from AC wall plug, internal combustion generators, vehicles as generators, etc.) external to the PTU (e.g., mounted to a sensor tower, station, or any other appropriate external mounting surface) are used to supply power to any of the various PTU payloads.

In various embodiments, power sources mounted on any appropriate PTU mount (e.g., stationary top mount or rotational side mount), or comprising any of the mounted PTU payloads, are used to supply power to any of the various PTU payloads.

Figure 4:
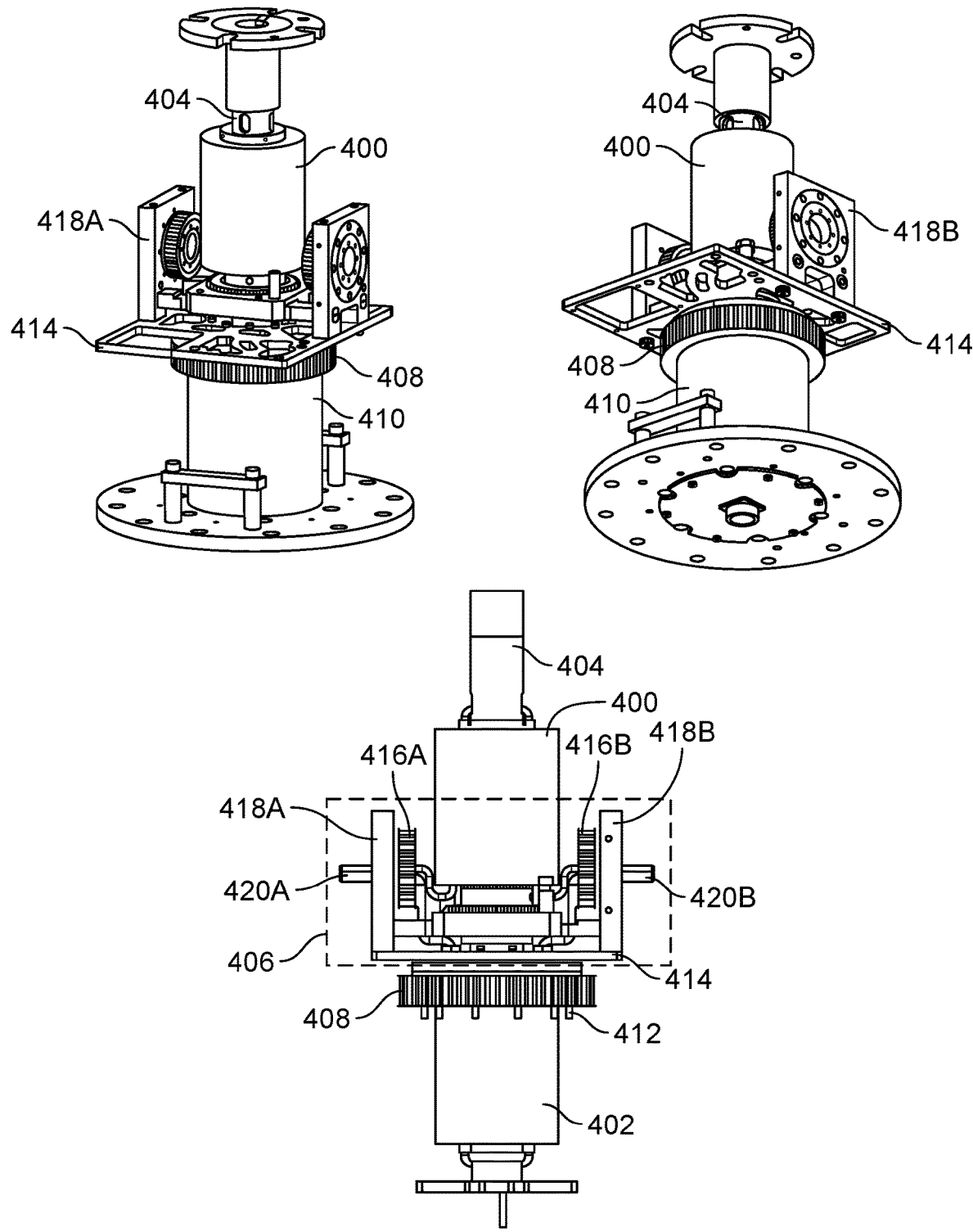
FIG. 4 is a block diagram illustrating perspective and side views of an embodiment of a pan and tilt assembly positioned between lower and upper slip ring units and mounted on a pan tilt unit base assembly.

FIG. 4 is a block diagram illustrating perspective and side views of an embodiment of a pan and tilt assembly positioned between lower and upper slip ring units and mounted on a pan tilt unit base assembly. In some embodiments, upper slip ring unit 400 of FIG. 4 comprises data slip ring unit 200 of FIG. 2. In some embodiments, lower slip ring unit 402 of FIG. 4 comprises power slip ring unit 300 of FIG. 3A. In some embodiments, stationary support cylinder 404 comprises cylindrical support 102 of FIG. 1. In some embodiments, PTU base collar 410 comprises PTU base collar 106 of FIG. 1. Note that in FIG. 4 belts that are used for relative motion are not shown.

In the example shown, the lower side view in FIG. 4 illustrates pan and tilt gear assembly 406 positioned between upper slip ring unit 400 and lower slip ring unit 402. In some embodiments, pan and tilt assembly 406 is coupled to the top of lower slip ring unit 402 so that it is free to rotate without limit around stationary support cylinder 404. In some embodiments, lower slip ring unit 402 is free to rotate relative to pan pulley 408. Pan pulley 408 is fixed to PTU base collar 410 and an outer housing of a lower slip ring is free to rotate relative to it.

In some embodiments, as illustrated in the top left side perspective view of FIG. 4, pan pulley 408 is inserted into PTU base collar 410 such that lower slip ring unit 402 is interior to PTU base collar 410. In some embodiments, pan pulley threaded fasteners 412 (as shown in the lower side view in FIG. 4) are threaded into corresponding holes (not visible) in the top of PTU base collar 410 to keep pan pulley 408 from rotating (i.e., pan pulley 408 is coupled to PTU base collar 410). In some embodiments, pan belt gear 408 is used to provide a stationary mating surface for a drive belt (not shown) to provide rotation of pan and tilt assembly 406 about stationary support cylinder 404 via a pan motor (not shown).

In some embodiments, as illustrated in the lower side view in FIG. 4, pan and tilt gear assembly 406 comprises pan and tilt base 414, tilt pulley 416A, tilt pulley 416B, tilt pulley support 418A, tilt pulley support 418B, tilt shaft 420A, and tilt shaft 420B. In some embodiments, pan and tilt base 414 is used to couple pan and tilt assembly 406 to the top of lower slip ring unit 402. In various embodiments, tilt pulley 416A, tilt pulley 416B, tilt pulley support 418A, tilt pulley support 418B, tilt pulley shaft 420A, and tilt pulley shaft 420B are used to provide tilt rotation to various payloads (not shown). In various embodiments, tilt rotation to a payload is enabled by coupling tilt gear pulley 420A or tilt gear pulley 420B to the payload or payload mount (not shown). In various embodiments, a tilt motor (not shown) is used to provide rotation of tilt pulley 416A and/or tilt pulley 416B. In various embodiments, the tilt motor is coupled to tilt pulley 416A and/or tilt pulley 416B via a drive belt (not shown). In some embodiments, two payload mounts are coupled to move together around a common tilt axis. In some embodiments, the two or more mounts are independently controllable for tilt position by using more than one tilt motor.

In some embodiments, a payload is connected to a slip ring in the tilt axis, so that tilt as well as pan rotation are not limited.

Figure 5:
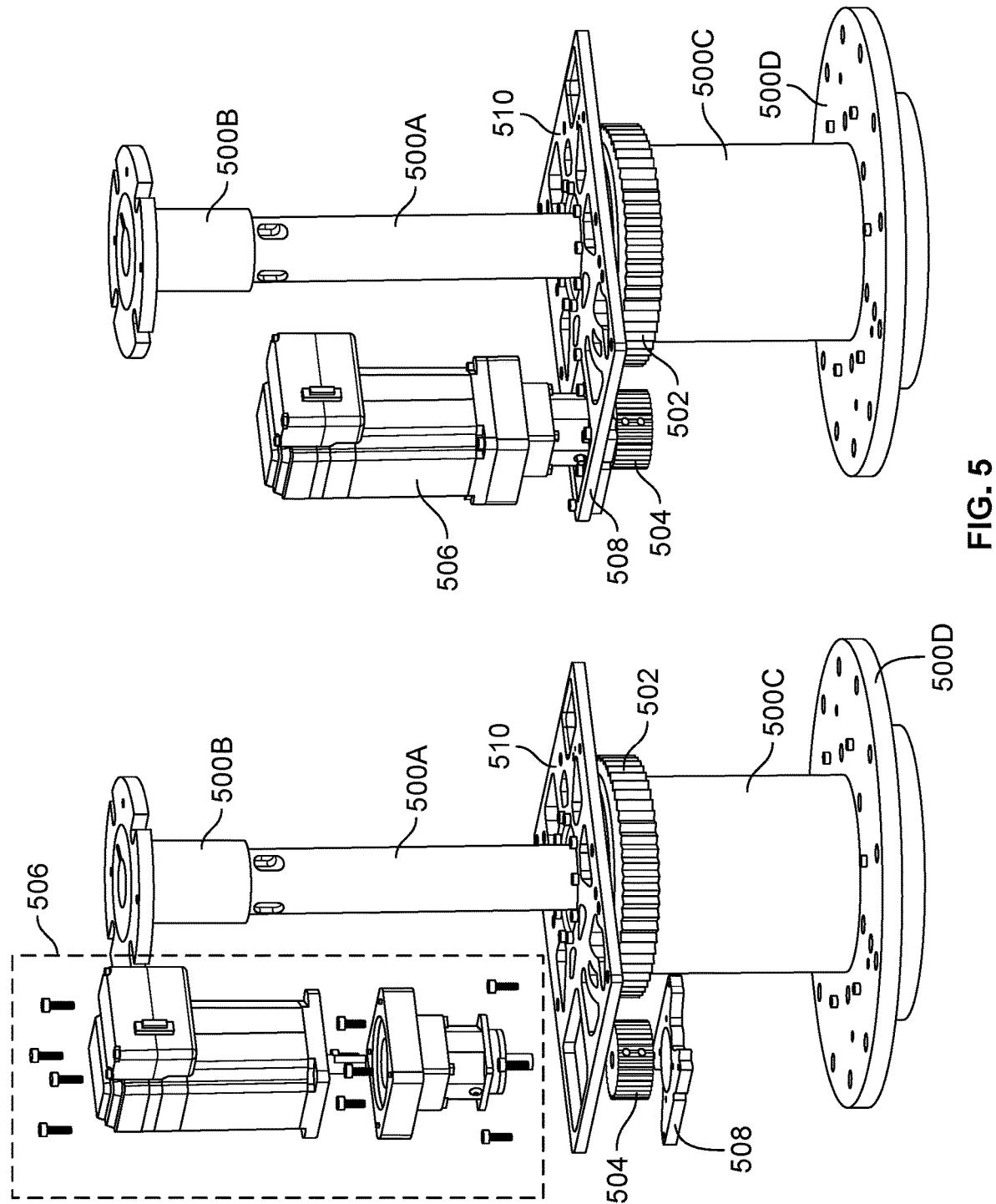
FIG. 5 is a block diagram illustrating exploded and perspective views of an embodiment of a pan motor mounted on a pan and tilt base support platform.

FIG. 5 is a block diagram illustrating exploded and perspective views of an embodiment of a pan motor mounted on a pan and tilt base support platform. In some embodiments, cylindrical support 500A, stationary mount 500B, PTU base collar 500C, and PTU base flange 500D comprise PTU base assembly 100 of FIG. 1. In some embodiments, pan pulley 502 comprises pan pulley 408 of FIG. 4. In some embodiments, pan and tilt gear base 510 comprises pan and tilt gear base 414 of FIG. 4.

In the example shown, as illustrated in the right side perspective view of FIG. 5, pan motor 506 is coupled to pan and tilt gear base 510. The left side perspective view of FIG. 5 illustrates an exploded view of pan motor 506, pan drive pulley 504, and coupling plate 508. In some embodiments, coupling plate 508 is used to couple pan motor 506 to pan and tilt gear base 510. In some embodiments, pan and tilt gear base 510 is coupled to the top of a lower slip ring unit (not shown) housed within PTU base collar 500C.

In some embodiments, the drive shaft of pan motor 506 is coupled to pan drive gear 504. In some embodiments, pan drive gear 504 is coupled to pan belt gear 502 via a drive belt (not shown). In some embodiments, pan motor 506 provides rotation of pan and tilt gear base 510 about cylindrical support 500A via pan drive gear 504, pan belt gear 502, and the drive belt. In some embodiments, rotation of pan and tilt gear base 510 is measured using a rotary encoder (not shown).

Figure 6:
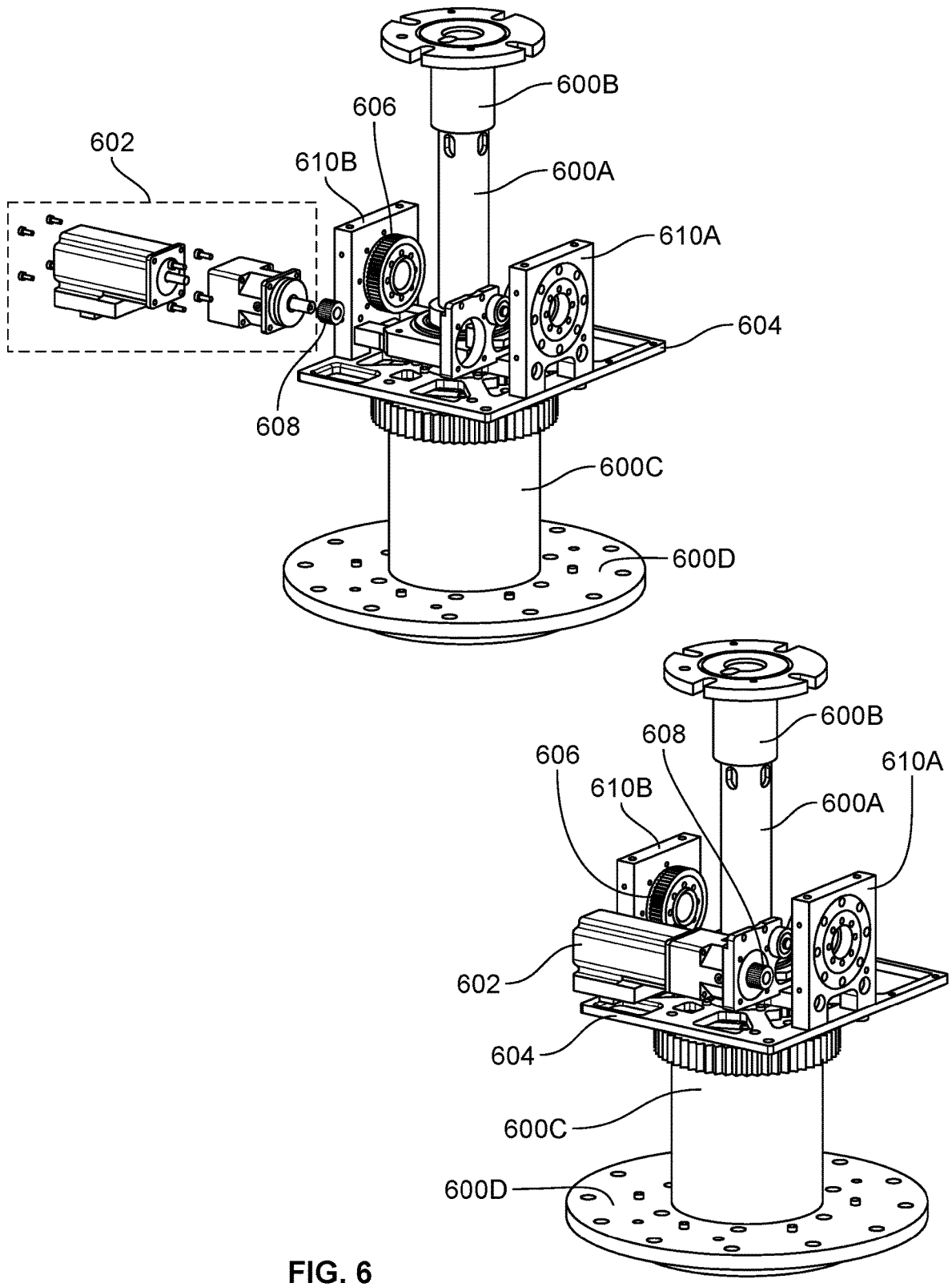
FIG. 6 is a block diagram illustrating exploded and perspective views of an embodiment of a tilt motor mounted on a pan and tilt assembly.

FIG. 6 is a block diagram illustrating exploded and perspective views of an embodiment of a tilt motor mounted on a pan and tilt assembly. In some embodiments, cylindrical support 600A, stationary mount 600B, PTU base collar 600C, and PTU base flange 600D comprise PTU base assembly 100 of FIG. 1. In some embodiments, pan and tilt base 604 comprises pan and tilt base 414 of FIG. 4. In some embodiments, tilt pulley 606 comprises tilt pulley 416B of FIG. 4. In some embodiments, tilt pulley 606 mounts to tilt bearing 610A tilt pulley support 610A comprises tilt pulley support 418A of FIG. 4. In some embodiments, the tilt pulley mounted on tilt pulley support 610A comprises tilt pulley 416A of FIG. 4. In some embodiments, tilt pulley 606 is mounted to a tilt bearing (e.g., a crossed roller bearing) allowing a heavy payload to be mounted without needing a secondary support.

In the example shown, as illustrated in the upper perspective view of FIG. 6, tilt motor 602 is an exploded view of tilt motor 602 that is to be mounted on pan and tilt pulley base 604. In some embodiments, tilt motor 602 is coupled to pan and tilt pulley base 604. The lower perspective view of FIG. 6 illustrating tilt motor 602 and tilt drive pulley 608 mounted on pan and tilt pulley base 604. In some embodiments, tilt drive pulley 608 is coupled to the drive shaft of tilt motor 602 (e.g., as illustrated in the lower perspective view of FIG. 6). In some embodiments, tilt drive pulley 608 is coupled to the tilt gear mounted on tilt pulley support 610A (similar to tilt pulley 606 mounted on tilt pulley support 610B) via a drive belt (not shown). In some embodiments, tilt motor 602 is used to provide rotation of the tilt pulley mounted on tilt pulley support 610A. In some embodiments, tilt pulley 606 is coupled to the tilt gear mounted on tilt pulley support 610A to move together around a common rotational axis. In various embodiments, tilt rotation to a payload is enabled by coupling tilt pulley 606 or the tilt pulley mounted on tilt pulley support 610A to the payload or payload mount (not shown).

Figure 7:
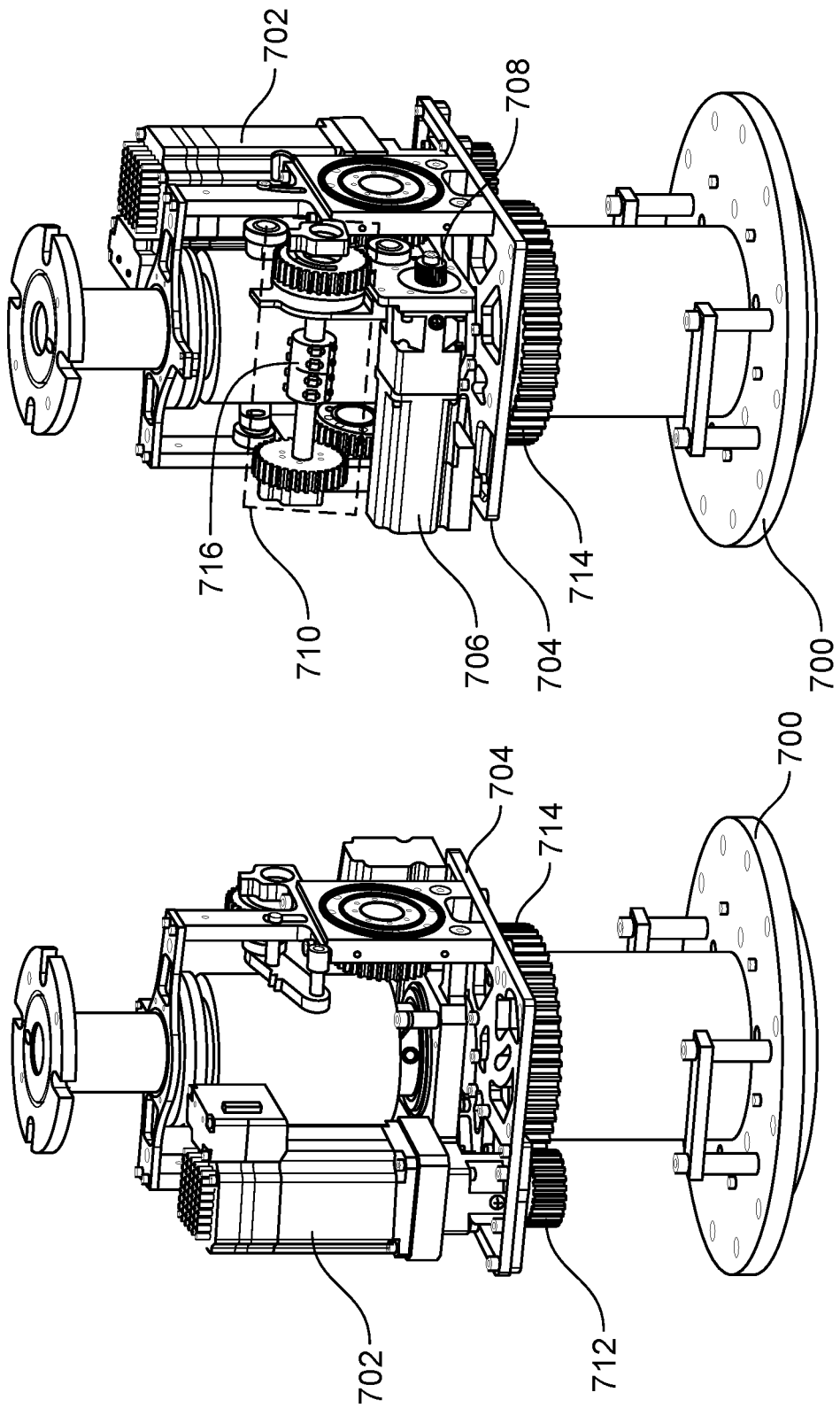
FIG. 7 is a block diagram illustrating perspective views of an embodiment of a pan tilt unit comprising a complete pan and tilt assembly.

FIG. 7 is a block diagram illustrating perspective views of an embodiment of a pan tilt unit comprising a complete pan and tilt assembly. In some embodiments, PTU base assembly 700 comprises PTU base assembly 100 of FIG. 1. In some embodiments, pan and tilt pulley base 704 comprises pan and tilt pulley base 414 of FIG. 4. In some embodiments, pan motor 702 and pan drive pulley 712 comprise pan motor 506 and pan drive pulley 504 of FIG. 5. In some embodiments, pan belt pulley 714 comprises pan belt pulley 408 of FIG. 4. In some embodiments, tilt motor 706 and tilt drive pulley 708 comprise tilt motor 602 and tilt drive pulley 608 of FIG. 6.

In the example shown, as illustrated in the left perspective view of FIG. 7, pan motor 702 is coupled to pan and tilt pulley base 704. As illustrated in the right perspective view of FIG. 7, tilt motor 706 is mounted on pan and tilt pulley base 704. In some embodiments, tilt motor 706 is coupled to pan and tilt pulley base 704.

In some embodiments, pan motor 702 is used to rotate pan and tilt pulley base 704 about the long axis of PTU base assembly 700 via pan drive pulley 712. In some embodiments, pan drive pulley 712 is coupled to pan belt pulley 714 via a drive belt (not shown).

In some embodiments, tilt motor 706 is used to rotate tilt drive pulley 708. In some embodiments, tilt drive pulley 708 is coupled to one of the two gears comprising tilt pulley coupler 710 (e.g., the gear immediately above tilt drive pulley 708). In some embodiments, tilt drive pulley 708 is coupled to tilt pulley coupler 710 via a drive belt (not shown). In some embodiments, tilt gear coupler 710 is coupled to the PTU tilt pulley (e.g., via drive belts) to provide tilt rotation to various payloads (not shown).

In some embodiments, tilt pulley coupler 710 comprises two gears on opposite ends of a split shaft (e.g., as illustrated in the right perspective view of FIG. 7). In some embodiments, the split shaft is coupled together by shaft coupler 716. In some embodiments, shaft coupler 716 comprises a clamp collar that holds the split shaft together by tightening clamping screws (e.g., allen screws). In various embodiments, shaft coupler 716 allows for independent tilt alignment of mounted payloads during assembly or during maintenance. In various embodiments, where independent tilt alignment of mounted payloads is not required, tilt pulley coupler 710 is a rigid single shaft or the split shafts are keyed wherein the shaft coupler comprises keyways that firmly grip the shaft's key(s) to eliminate slipping. In various embodiments, the shaft coupler does not comprise keyways instead the pulleys themselves have keyways pressed or set screwed. In various embodiments, the split shafts are not keyed and are instead set screwed, glued, press fit, sweat fit, or any other appropriate manner of coupling the split shafts.

Figure 8:
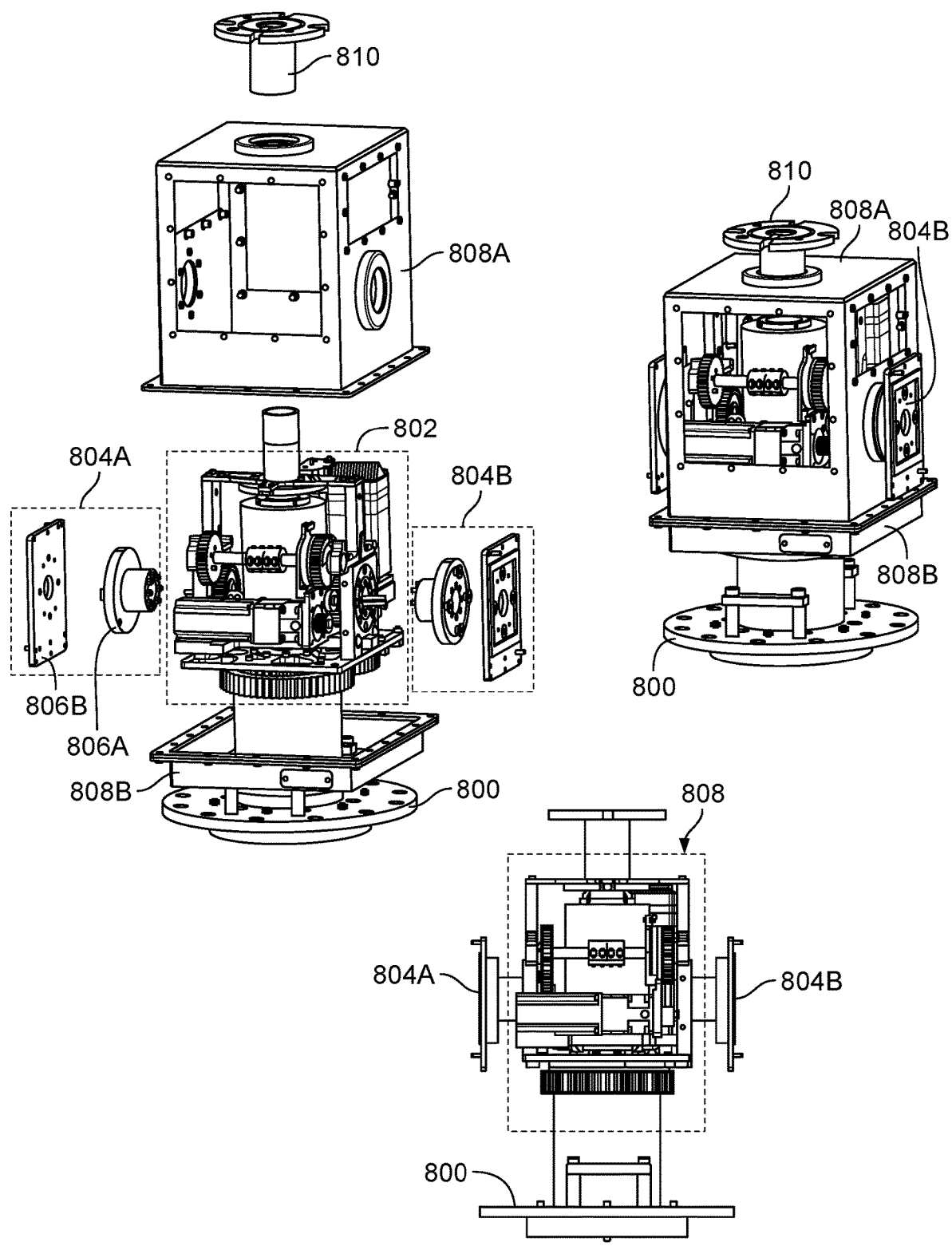
FIG. 8 is a block diagram illustrating perspective and side views of an embodiment of a pan tilt unit with enclosure.

FIG. 8 is a block diagram illustrating perspective and side views of an embodiment of a pan tilt unit with enclosure. In some embodiments, PTU base assembly 800 comprises PTU base assembly 100 of FIG. 1. In some embodiments, PTU base assembly 800 and PTU pan and tilt module 802 comprise the entire PTU assembly of FIG. 7.

In the example shown, as illustrated in the top left perspective view of FIG. 7, payload mount 804A comprises tilt pulley shaft flange 806A and payload mounting plate 806B. In some embodiments, tilt pulley shaft flange 806A is used to couple payload mounting plate 806B to the tilt pulley shaft (e.g., via a tilt gear shaft similar to tilt pulley shaft 420B of FIG. 4). In some embodiments, payload mounting plate 806B is coupled to one or more PTU side-mounted payloads (e.g., a camera or any other appropriate sensor). In some embodiments, payload mount 804A and payload mount 804B are used to provide tilt rotation to various payloads (not shown). In some embodiments, tilt rotation of the various payloads is measured using a non-contact tilt encoder (not shown).

In some embodiments, as shown in the lower perspective view of FIG. 7, enclosure profile 808 illustrates a protective perimeter to protect PTU pan and tilt module 802 against weather and debris ingress (e.g., rain, snow, wind, dust, sand, etc.). In some embodiments, as shown in the upper perspective views of FIG. 7, enclosure profile 808 comprises enclosure top 808A and enclosure bottom 808B.

In some embodiments, enclosure 808 comprises a box (e.g., aluminum or any other appropriate protective material). In some embodiments, as shown in the upper left exploded view of FIG. 7, enclosure top 808A comprises multiple access ports (e.g., rectangular access ports) to allow for alignment, calibration, repair, and maintenance of PTU pan and tilt module 802. In some embodiments, cover plates (e.g., metal cover plates) (not shown) are used to cover and seal (e.g., using gaskets) the access ports against weather ingress.

In some embodiments, enclosure top 808A comprises openings for, and seals (e.g., shaft seals) around, payload mount 804A, payload mount 804B, and stationary mount 810. In some embodiments, enclosure bottom 808B comprises an opening for, and a seal (e.g., a collar seal) around, the base collar of PTU base assembly 800. In some embodiments, a seal (e.g., a gasket) is used between enclosure top 808A and enclosure bottom 808B to protect against weather ingress.

Figure 9:
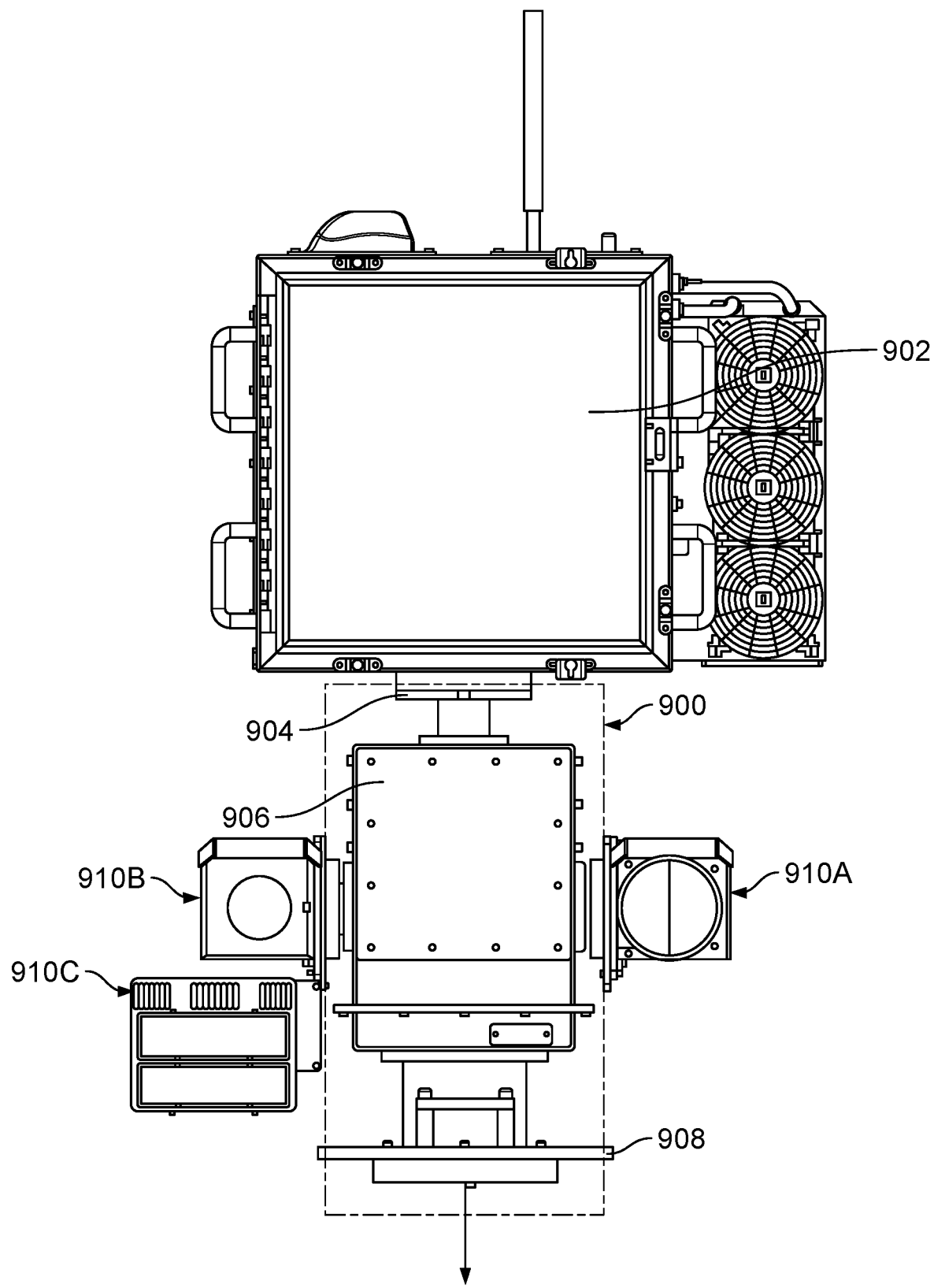
FIG. 9 is a block diagram illustrating an embodiment of an enclosed pan tilt unit with top-mounted computer and exemplary side-mounted payloads.

FIG. 9 is a block diagram illustrating an embodiment of an enclosed pan tilt unit with top-mounted computer and exemplary side-mounted payloads. In some embodiments, PTU 900 comprises the entire pan tilt unit (with enclosure) of FIG. 8. In the example shown in FIG. 9, computer 902 is mounted to the top of PTU 900 (e.g., using stationary mount 904). In the example shown, the access ports of PTU 900 are sealed against weather ingress (e.g., using access port cover 906). In some embodiments, PTU base flange 908 is used to couple the PTU (e.g., PTU 900) with its mounted payloads (e.g., payload 910A, payload 910B, and payload 910C) and computer (e.g., computer 902) to a sensor tower, station, or to another PTU (e.g., using through-holes in the PTU base flange). In various embodiments, PTU payloads are added to, mounted on, or otherwise coupled to, one or more payloads that are mounted to a PTU mounting plate—for example, as shown in FIG. 9, payload 910C is coupled to payload 910B which is mounted to the payload mounting plate of PTU 900. In various embodiments, payload 910A, payload 910B, and/or payload 910C are directly mounted to the payload mounting plates of PTU 900. In various embodiments, payload 910A, payload 910B, and payload 910C comprise payloads that require directional positioning (e.g., a camera, an audio sensor, a radar sensor, a lidar sensor, a laser, an illuminating device, etc.).

In various embodiments, payload 910A, payload 910B, and payload 910C can tilt up or down. In some embodiments, a payload (e.g., payload 910A or payload 910B) is limited in its range of tilt (e.g., using a stop pin) to prevent it from over rotating—for example, to prevent a payload from causing damage to itself, another mounted payload, and/or any other interfering protuberance. In some embodiments, payload 910A, payload 910B, and payload 910C tilt up and down about a common rotation axis. In some embodiments, payload 910A and payload 910B tilt independently (e.g., by using more than one tilt motor).

Figure 10:
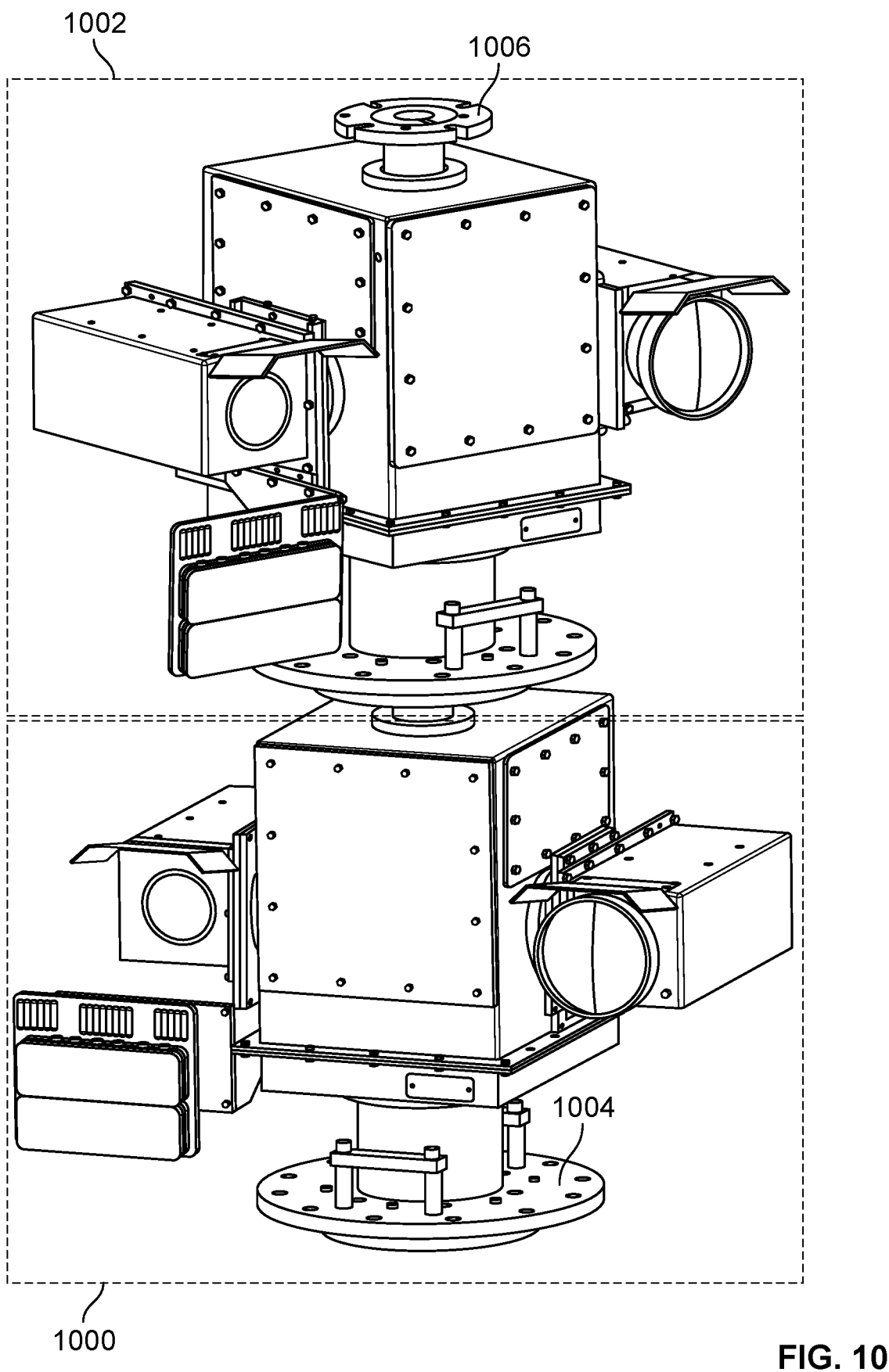
FIG. 10 is a block diagram illustrating an embodiment of a stacked pair of enclosed pan tilt units with side-mounted exemplary payloads.

FIG. 10 is a block diagram illustrating an embodiment of a stacked pair of enclosed pan tilt units with side-mounted exemplary payloads. In some embodiments, PTU 1000 (with side-mounted payloads) comprises the pan tilt unit with side-mounted payloads of FIG. 9 (without the top mounted computer). In the example shown, PTU 1002 is mounted to the stationary top mount of PTU 1000 (e.g., via a stationary mount similar to stationary mount 104 of FIG. 1). In some embodiments, PTU 1002 is free to pan and tilt independently of PTU 1000 and PTU 1000 is free to pan and tilt independently of PTU 1002. In various embodiments, PTU 1000 is mounted to a sensor tower, station, or to another PTU (e.g., via PTU base flange 1004). In some embodiments, another PTU, a computer, or any other appropriate payload is mounted to the top of PTU 1002 (e.g. via stationary top mount 1006).

Figure 11:
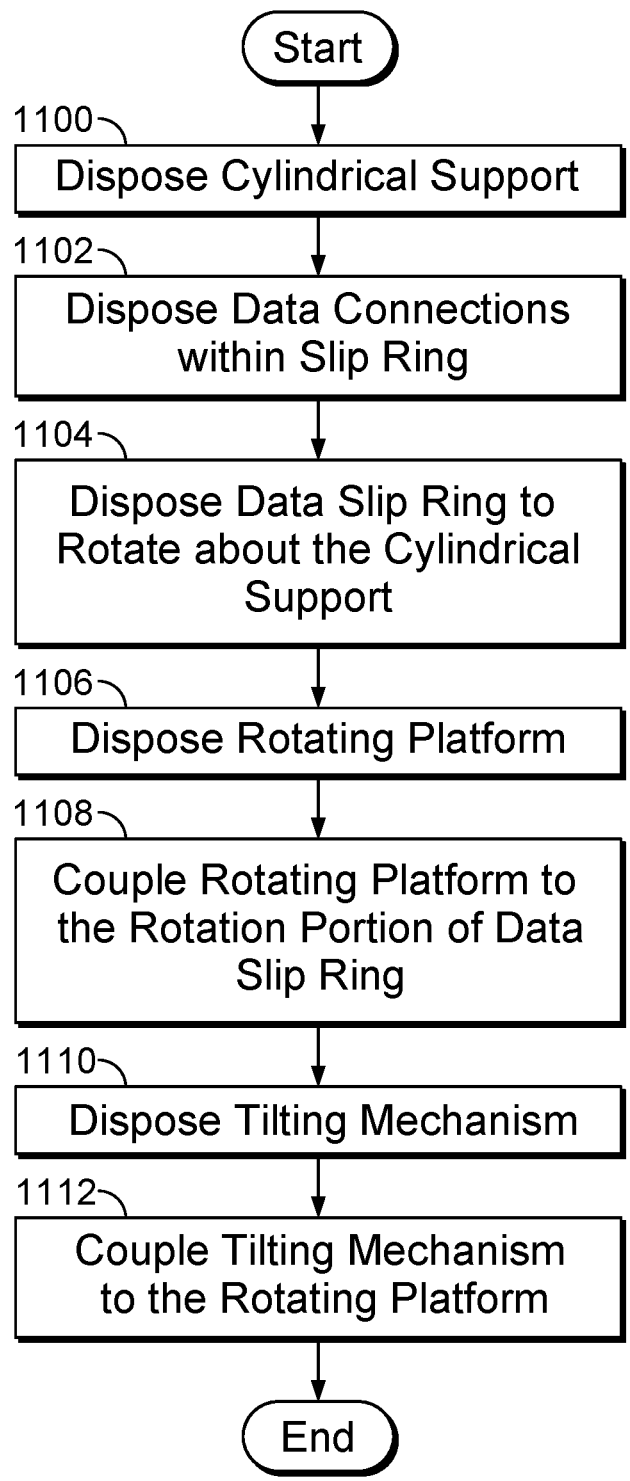
FIG. 11 is a flow diagram illustrating an embodiment of a method for assembling a pan tilt unit.

FIG. 11 is a flow diagram illustrating an embodiment of a method for assembling a pan tilt unit. In the example shown, in 1100, a cylindrical support is disposed. In some embodiments, the cylindrical support comprises a rigid hollow tube. In some embodiments, the rigid hollow tube comprises an aluminum tube. In some embodiments, the entire cylindrical support is made of aluminum or any other appropriate material to provide strength, rigidity, durability, and light weight (e.g., titanium). In some embodiments, the cylindrical support comprises through-holes to allow cabling to pass from the interior to the exterior of the cylindrical support. In some embodiments, a top platform is coupled to a top of the cylindrical support. In various embodiments, the top platform is used to couple the cylindrical support to another PTU cylindrical support, to a computation unit, or to any other appropriate payload. In some embodiments, the cylindrical support comprises a base flange used to couple the PTU to a sensor tower, station, or to another PTU.

In 1102, data connections are disposed within a slip ring. In some embodiments, the data slip ring rotates with no rotation limit around the cylindrical support. In various embodiments, the slip ring houses one or more interior slip rings to allow transmission of data to or from the various PTU payloads. In some embodiments, the data connections comprise a plurality of shielded connections. In some embodiments, the plurality of shielded connections comprise alternating signal and ground connections for the slip ring unit. In some embodiments, the data connections comprise 4, 8, 12, 16, or 24 data connections.

In some embodiments, separate slip ring units are used to supply power. In some embodiments, a power slip ring comprises one or more connection paths. In some embodiments, the power slip ring includes any number N of power connectors and a ground connector.

In various embodiments, any number N of data and/or power slip ring units, each comprising any number of connection paths, can be stacked one upon the other around the PTU cylindrical support to provide as many connections as desired.

In 1104, the data slip ring is disposed to rotate about the cylindrical support. In some embodiments, a slip ring fixation collar is used to fix the data slip ring to the cylindrical support to allow the data slip ring to rotate. In various embodiments, the data slip ring is affixed to the cylindrical support using glue, threaded hole, slot, quick release pin, retaining clip, cotter pin, or any other appropriate manner affixing.

In 1106, a rotating platform is disposed. In some embodiments, the rotating platform comprises a pan and tilt gear base, a pan motor, a pan drive gear, a coupling plate, and a pan belt gear, wherein the pan drive gear is coupled to the pan belt gear via a drive belt. In some embodiments, the rotating platform's angular position, velocity, and acceleration are measured using a rotary encoder.

In 1108, the rotating platform is coupled to the rotating portion of the data slip ring of 1104. In some embodiments, the rotating platform is coupled to the top of the data slip ring. In some embodiments, the rotating platform is coupled to the rotating portion of a power slip ring (e.g., the top of the power slip ring).

In 1110, a tilting mechanism is disposed. In some embodiments, the tilting mechanism comprises a tilt motor, a tilt drive gear, a tilt gear coupler, and a shaft coupler, wherein the tilt drive gear is coupled to the tilt gear coupler (e.g., via a drive belt or other drive mechanism) and the tilt gear coupler is coupled to the PTU tilt gears (e.g., via drive belts). In some embodiments, the tilting mechanism comprises two mounts on opposite sides of the cylindrical support. In some embodiments, the two mounts are coupled to move together around a common tilt axis. In various embodiments, a mount of the two mounts is coupled to one of the following: a camera, an audio sensor, a radar sensor, laser, spotlight, a lidar sensor, or any other appropriate payload. In some embodiments, the two mounts rotate independently of each other.

In 1112, the tilting mechanism is coupled to the rotating platform. In some embodiments, the tilt mechanism's angular position, velocity, and acceleration are measured using a rotary encoder. In some embodiments, the assembled pan tilt unit is one of a plurality of pan tilt units. In some embodiments, the plurality of pan tilt units are stacked onto the cylindrical support

What is claimed is:

1. A system, comprising:
   a pan tilt unit, comprising:
      a support;
      a slip ring including an inner static portion and an outer rotating portion, wherein the outer rotating portion of the slip ring is able to rotate about the support, wherein the inner static portion of the slip ring is coupled to the support to prevent the inner static portion of the slip ring from rotating relative to the support, and wherein the slip ring comprises connections between the inner static portion of the slip ring and the outer rotating portion of the slip ring;
      a top platform coupled to a top of the support;
      a rotating platform, wherein the rotating platform is coupled to the outer rotating portion of the slip ring;
      a panning mechanism configured to rotate the rotating platform about the support to provide a pan rotation of a payload, wherein the panning mechanism includes a pan belt pulley and a pan motor, wherein the pan belt pulley is arranged below the rotating platform, and wherein the pan motor is mounted on the rotating platform and extends above the rotating platform; and
      a tilting mechanism, wherein the tilting mechanism is coupled to the rotating platform; and
      a computation unit mounted on a top of the top platform of the pan tilt unit.

2. The system of claim 1, wherein the slip ring comprises a data slip ring.

3. The system of claim 2, wherein the data slip ring is configured to rotate with no rotation limit around the support.

4. The system of claim 1, wherein the connections comprise a plurality of shielded connections.

5. The system of claim 4, where the plurality of shielded connections comprise alternating signal and ground connections for the slip ring.

6. The system of claim 1, wherein the slip ring comprises a power slip ring.

7. The system of claim 6, wherein the power slip ring is coupled to the rotating platform.

8. The system of claim 6, wherein the power slip ring includes N power connectors and a ground connector, wherein N one or more.

9. The system of claim 1, wherein the support comprises a rigid hollow tube.

10. The system of claim 9, wherein the rigid hollow tube comprises a metal tube.

11. The system of claim 1, wherein the pan tilt unit is one pan tilt unit of a plurality of pan tilt units.

12. The system of claim 11, wherein the plurality of pan tilt units are stacked.

13. The system of claim 1, wherein the tilting mechanism comprises two or more mounts.

14. The system of claim 13, wherein two mounts of the two or more mounts are coupled to move together around a common tilt axis.

15. The system of claim 14, wherein a mount of the two or more mounts is coupled to one of the following: a camera, an audio sensor, a radar sensor, a laser illuminator, or a lidar sensor.

16. The system of claim 1, wherein an angular position of the rotating platform, a velocity of the rotating platform, or an acceleration of the rotating platform is adapted to be measured using a rotary encoder.

17. The system of claim 1, wherein an angular position of the tilting mechanism, a velocity of the tilting mechanism, or an acceleration of the tilting mechanism is adapted to be measured using a rotary encoder.

18. The system of claim 1, wherein the support comprises a path or a channel for passing wiring, tubing, and/or hoses through the support.

19. A method, comprising:
   disposing a pan tilt unit, comprising:
      disposing a support;
      disposing a slip ring including an inner static portion and an outer rotating portion, wherein the outer rotating portion of the slip ring is able to rotate about the support, wherein the inner static portion of the slip ring is coupled to the support to prevent the inner static portion of the slip ring from rotating relative to the support, and wherein the slip ring comprises connections between the inner static portion of the slip ring and the outer rotating portion of the slip ring;
      disposing a top platform, wherein the top platform is coupled to a top of the support;
      disposing a rotating platform, wherein the rotating platform is coupled to the outer rotating portion of the slip ring;
      disposing a panning mechanism configured to rotate the rotating platform about the support to provide a pan rotation of a payload, wherein the panning mechanism includes a pan belt pulley and a pan motor, wherein the pan belt pulley is arranged below the rotating platform, and wherein the pan motor is mounted on the rotating platform and extends above the rotating platform; and disposing a tilting mechanism, wherein the tilting mechanism is coupled to the rotating platform; and disposing a computation unit, wherein the computation unit is mounted on a top of the top platform of the pan tilt unit.

\* \* \* \* \*

UNITED STATES PATENT AND TRADEMARK OFFICE
CERTIFICATE OF CORRECTION

| | |
|---|---|
| PATENT NO. | : 11,732,836 B2 |
| APPLICATION NO. | : 17/582460 |
| DATED | : August 22, 2023 |
| INVENTOR(S) | : McHenry Carlson, Torin Herndon and John Henry Harris, III |

It is certified that error appears in the above-identified patent and that said Letters Patent is hereby corrected as shown below:

In the Claims

In Column 14, Line 19, Claim 8, before "one or more", insert --is--.

Signed and Sealed this
Seventh Day of November, 2023

Katherine Kelly Vidal
*Director of the United States Patent and Trademark Office*